United States Patent [19]

Baker et al.

[11] Patent Number: 5,060,108
[45] Date of Patent: Oct. 22, 1991

[54] PACKAGING AND SEALING FOR PRESSURE TRANSDUCER

[75] Inventors: Gary A. Baker, North Scituate, R.I.; Peter G. Berg, Attleboro Falls, Mass.

[73] Assignee: Texas Instruments Incorporated, Dallas, Tex.

[21] Appl. No.: 477,361

[22] Filed: Jan. 25, 1990

[51] Int. Cl.5 .......................... H01G 7/00; G01L 9/12
[52] U.S. Cl. ........................................ 361/283; 73/718
[58] Field of Search ................. 361/283; 73/718, 724; 277/235 R

[56] References Cited

U.S. PATENT DOCUMENTS

| | | | |
|---|---|---|---|
| 2,443,545 | 6/1948 | Schwennesen | 361/538 X |
| 3,611,054 | 10/1971 | Piper et al. | 361/538 |
| 3,910,106 | 10/1975 | Brady | 73/726 X |
| 4,290,614 | 9/1981 | Moll | 277/236 X |
| 4,329,732 | 5/1982 | Kayli et al. | 361/283 |
| 4,414,851 | 11/1983 | Maglic | 361/283 X |
| 4,716,492 | 12/1987 | Charboneau et al. | 361/283 |
| 4,832,353 | 5/1989 | Nicholson | 277/236 X |
| 4,888,662 | 12/1989 | Bishop | 361/283 |
| 4,932,673 | 6/1990 | Domnikov et al. | 277/235 R |

*Primary Examiner*—Donald A. Griffin
*Attorney, Agent, or Firm*—John A. Haug; James P. McAndrews; Melven Sharp

[57] ABSTRACT

A pressure transducer having a capacitive pressure sensing moudle disposed in a housing is biased against a sealing ring disposed in a chamber circumscribing a fluid pressure inlet by a retainer ring mounted in the housing. A selected back-up washer may be used to accommodate various size pressure sensing modules. The housing is sealed from the environs by means of a hermetic glass-to-metal header which mounts terminals to provide electrical coupling to electronics mounted in the housing.

18 Claims, 1 Drawing Sheet

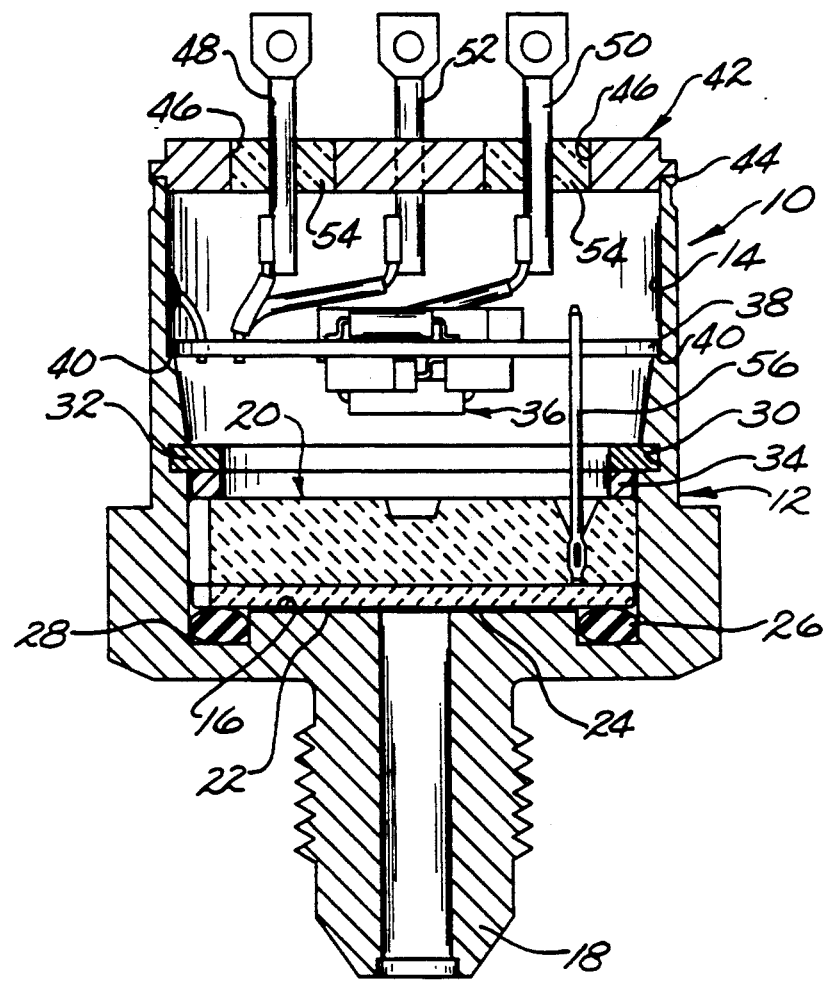

PACKAGING AND SEALING FOR PRESSURE TRANSDUCER

BACKGROUND OF THE INVENTION

This invention relates generally to pressure sensors and more particularly to a packaging and sealing system for fluid pressure transducers.

Pressure sensors containing pressure transducers are well known, typical such systems being described in U.S. Pat. Nos. 4,716,492, 4,774,626, 4,888,662 and 4,903,164.

Pressure transducers of the prior art have generally been fabricated by providing a pressure sensing module including an electronic circuit having a variable capacitor responsive to fluid pressure. The electronic circuit sensed the capacitance of the capacitor and provided an output through a plastic electrical connector indicative of the sensed pressure. The transducer elements were arranged such that a metal cup assembly having an opening or fluid pressure inlet at one end thereof to receive the fluid under pressure to be measured also included therein the pressure sensing module. The pressure sensing module was spaced from the inlet by a gasket or o-ring, the electronic circuit and connector also being contained within the metal cup. The parts were held together within the metal cup by crimping the metal cup over the plastic connector.

The above described pressure transducer provides highly satisfactory results when operated with certain fluids and within certain pressure ranges however a need has developed to provide a transducer which can be used in various environments and fluids including some which are corrosive in nature or hazardous in some respect with a concomitant need to prevent leakage of either the fluid being sensed to the transducer chamber housing the electronic circuitry or even the environment in general. In certain other applications it is necessary to prevent the atmosphere of the environment from leaking into the transducer chamber which could otherwise result in some deleterious effect on the electronics, such as corrosion.

Attempts have been made to provide a hermetic seal between the pressure sensing module and the metallic housing around the fluid inlet of the housing, for example by providing a transition element composed of ceramic and metal, ceramic for connection to the pressure sensing module and metal for connection to the housing, however due in part to the small size of the component parts it is very difficult to avoid damaging the ceramic to metal seal from the heat caused by the welding procedure needed to join the metal parts together.

SUMMARY OF THE INVENTION

It is therefore an object of the invention to provide a pressure transducer which can be used with a variety of fluids to be sensed and in a variety of environments including corrosive or otherwise hazardous in nature. Yet another object is the provision of a pressure transducer useful with various pressure levels utilizing a minimum number of components which require changes for the various pressure levels.

Briefly, in accordance with the invention, a metallic cup shaped housing forms a chamber having a first portion which receives a pressure sensing module and a second portion which receives related electronics. The bottom wall of the housing is formed with a fluid pressure inlet and has an annular groove circumscribing the inlet. An environmental seal is provided by means of a sealing ring of suitable material such as elastomer, metal-filled elastomer or metal disposed in and projecting upwardly from the groove. When metal-filled elastomer or metal is employed a grounding connection can be provided between the housing and a conductive layer placed on the bottom, pressure sensing surface of the module. Further, when metal is employed a hermetic seal can be obtained. An annular groove is formed in the cylindrical side wall of the housing and receives therein a retaining ring which is adapted to place a biasing force on a variable capacitor pressure sensing module received over the sealing ring. According to a feature of the invention a back-up washer of a selected height can be inserted between the retaining ring and the pressure sensing module in order to accommodate modules of different heights based on the particular pressure range the sensor is to be used with. A ledge is formed in the side wall above the groove and it receives a circuit board containing signal processing electronics for the capacitive pressure sensing module. A metallic header ring having electrical terminals extending therethrough and electrically isolated therefrom by means of conventional glass eyelets is welded to the distal free end portion of the side wall to form a hermetic seal therewith.

BRIEF DESCRIPTION OF THE DRAWING

The sole FIGURE is a cross sectional view of a pressure transducer made in accordance with the present invention.

DESCRIPTION OF THE PREFERRED EMBODIMENT

Referring now to the drawing there is shown a pressure transducer 10 of the type disclosed in the above noted patents. The pressure transducer 10 includes a metal housing 12, preferably formed of stainless steel and having an interior, cylindrical side wall 14 substantially normal to the bottom wall 16 of the housing. A fluid pressure inlet 18 extends to the interior of the housing 12. A pressure sensing module 20 having a pressure responsive surface 22 is spaced from the surface 16 to form a pressure cavity 24 therebetween.

A sealing ring 26 is disposed in an annular groove 28 circumscribing inlet 18 and cavity 24 and projecting above bottom wall 16. The sealing ring can be composed of metal such as silver plated stainless steel, elastomer or metal-filled elastomer depending on the particular fluids to be sensed and the pressure ranges to which the sensor will be subjected. When the pressure transducer is to be used with certain fluids to be sensed which contain conductive ions or the like, such as sea water, it may be desirable to provide a ground connection between the sensing module and the housing to avoid undesirable calibration shifts. This can be accomplished by placing a conductive coating, e.g. gold, on the bottom, outer pressure sensing surface of the pressure sensing module and using either a metal-filled elastomer or a metal sealing ring 26. Further, if it is desired to obtain a hermetic seal between the fluid to be sensed and the chamber of the housing this can be effected by means of a metal sealing ring 26 such as a C-shaped (in cross section) silver coated stainless steel ring with an appropriate loading level which can be provided as described below. The silver is sufficiently soft to fill in any voids in surfaces contiguous to ring 26 to provide the hermetic seal as opposed to an environmental seal. By a hermetic seal is meant one which limits leakage to less than $10^{-8}$ cc of helium per second with a differential of one atmosphere.

An annular groove 30 is formed in side wall 14 lying generally in a plane which is parallel to bottom wall 16 and is adapted to receive a retaining element therein, such as a snap retainer ring 32. During assembly pressure sensing module 20 is placed onto sealing ring 26 and a force is exerted on module 20 in a downward direction to allow insertion of retainer ring 32 to lock the module in sealed relation to inlet 18 in accordance with the type of seal chosen as referenced above. The drawing also shows a back-up washer 34 of suitable stainless steel or the like intermediate pressure sensing module 20 and retainer ring 32. The particular thickness of the pressure responsive diaphragm, surface 22, is selected to be consistent with the range of pressures with which the sensor is to be used and therefore a single housing 12 having a predetermined distance from groove 30 to bottom wall 16 can be used with pressure sensing modules having different heights based on the thickness of the diaphragm by selecting a back-up washer 34 of appropriate height. It will be understood that, if desired, the position of groove 30 could also be selected so that it would accommodate a specific pressure sensing module without use of a back up washer.

Electronic circuitry 36 including a circuit board 38 is disposed in a second portion of the chamber formed in housing 12 with board 38 received on a ledge 40 formed in an extended side wall 14. A metal header 42 is received on the distal free end portion 44 of side wall 14 and is hermetically attached thereto as by welding. The distal end portion 44 is sufficiently removed from the pressure sensing module that heat produced during the welding operation has no harmful effects on the module. Header 42 is formed with a plurality of terminal receiving apertures 46 and a respective terminal 48, 50, 52 is received therethrough and is mounted and electrically separated from the header by conventional glass material 54, the aperture and glass material for terminal 52 not being shown in the FIGURE since the terminal does not lie in the plane of the cross section. Suitable electrical connections are made coupling the terminals to the electronics 36 and for coupling the electronics 36 to the pressure sensing module 20, one such connection means indicated at 56.

Thus the hermetic seal of the header is effective to prevent any corrosive or hazardous atmosphere in the environment from reaching the electronics. Further, any fluid material which may leak through sealing ring 26 will be prevented from reaching the atmosphere beyond the transducer. The snap retaining ring 32 serves as a convenient and effective loading mechanism for the sealing ring 26 and, with the back-up washer 34, allows the use of a single housing body for a variety of pressure ranges. Sealing ring 26 can provide either an environmental or a hermetic seal and can also provide a ground connection for use with certain fluids to avoid calibration shifts.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

What is claimed:

1. A pressure transducer having an improved seal comprising a metallic cup shaped housing with a bottom wall and an integrally attached generally cylindrical side wall extending therefrom to a free distal end portion defining a chamber therein, the chamber having a first pressure sensing module receiving portion and a second electronics receiving portion, a pressure fluid inlet formed in the bottom wall, a pressure sensing module disposed in the first portion of the chamber in communication with the pressure fluid inlet, seal means disposed intermediate the pressure sensing module and the bottom wall circumscribing the fluid inlet, a groove formed in the internal surface of the cylindrical side wall, a retainer ring disposed in the groove placing a force on the pressure sensing module against the seal means, electronics board mounting means formed in the second portion of the chamber, an electronics board mounted on the mounting means, a metallic header received on the free distal end portion of the cylindrical wall and welded thereto, the header having terminal receiving apertures extending therethrough, a terminal extending through each aperture and electrically separated from the header by glass material, the terminals electrically coupled to the electronics board and electrical coupling means connecting the electronics board to the pressure sensing module.

2. A pressure transducer according to claim 1 further including a rigid annular element placed between the retainer ring and the pressure sensing module, the annular element having a height selected in accordance with the height of the pressure sensing module.

3. A pressure transducer according to claim 1 in which the electronics board mounting means comprises a ledge formed in the cylindrical side wall.

4. A pressure transducer according to claim 1 in which the seal means is an elastomeric o-ring.

5. A pressure transducer according to claim 1 in which the seal means is a metallic o-ring.

6. A pressure transducer according to claim 1 in which the seal means is a metal loaded elastomeric o-ring.

7. A pressure transducer which comprises a housing having a bottom wall with a fluid pressure inlet defined therethrough and a side wall extending from the bottom wall to form a chamber,
   a groove formed in the side wall in communication with the chamber dividing the chamber into a first pressure sensing module receiving portion and a second electronics receiving portion,
   a pressure sensing module having a rigid substrate and a pressure responsive diaphragm mounted on the substrate, the pressure sensing module disposed in the first portion of the chamber, sealing material disposed between the pressure sensing element and the bottom wall circumscribing the fluid inlet, and
   a retainer ring disposed in the groove placing a force on the pressure sensing module against the sealing material, and
   a rigid annular element placed between the retainer ring and the pressure sensing module, the annular element having a height selected in accordance with the height of the pressure sensing module.

8. A pressure transducer according to claim 7 in which the sealing material is configured as an o-ring and comprises an elastomeric material.

9. A pressure transducer according to claim 7 in which the sealing means is configured as an o-ring and comprises a metal loaded elastomeric material.

10. A pressure transducer according to claim 7 in which the sealing means is configured as an o-ring and comprises a metal material.

11. A pressure transducer having an improved seal comprising a cup shaped housing with a bottom wall and a side wall extending therefrom to a free distal end portion defining a chamber therein, the chamber having a pressure sensing module receiving portion, a pressure fluid inlet formed in the bottom wall, a pressure sensing module disposed in the portion of the chamber in communication with the pressure fluid inlet, seal means disposed intermediate the pressure sensing module and the bottom wall circumscribing the pressure fluid inlet, a groove formed in the internal surface of the side wall, a retainer element received in the groove and extending outwardly therefrom placing a force on the pressure sensing module against the seal means, a rigid spacer element placed between the retainer element and the pressure sensing module, the spacer element having a height selected in accordance with the height of the pressure sensing module, a header mounting electrical terminal means received at the distal end portion of the side wall closing the chamber and being sealed thereto, the electrical terminal means providing electrical power and signal conducting means for the transducer.

12. A pressure transducer according to claim 11 further including electronic means disposed in the chamber and electrically coupled to the pressure sensing module and the electrical terminals.

13. A pressure transducer according to claim 12 in which an annular groove is formed in the bottom wall in communication with the chamber and the seal means circumscribing the pressure fluid inlet is an elastomeric o-ring.

14. A pressure transducer according to claim 12 in which an annular groove is formed in the bottom wall in communication with the chamber and the seal means circumscribing the pressure fluid inlet is a metal loaded elastomeric o-ring.

15. A pressure transducer according to claim 12 in which an annular groove is formed in the bottom wall in communication with the chamber and the seal means circumscribing the pressure fluid inlet is a metal o-ring.

16. A pressure transducer which comprises a metallic housing having a bottom wall with a fluid pressure inlet defined therethrough and a side wall extending from the bottom wall to form a chamber, a capacitive pressure sensing module having a rigid substrate and a pressure responsive diaphragm mounted on the substrate, electrically conductive layers disposed respectively on facing surfaces of the substrate and the diaphragm, the module having an outer, pressure sensitive surface, an electrically conductive grounding layer disposed on the outer pressure sensitive surface, the module disposed in the chamber with the pressure sensitive surface in communication with the fluid pressure inlet, and electrically conductive sealing means disposed between the pressure sensitive surface and the bottom wall of the housing to complete an electrically conductive coupling between the outer pressure sensitive surface and the housing.

17. A pressure transducer according to claim 16 in which the sealing means comprises a metal-filled elastomer o-ring.

18. A pressure transducer according to claim 16 in which the sealing means comprises a metallic o-ring.

* * * * *